United States Patent
Chiba et al.

(10) Patent No.: US 9,616,729 B2
(45) Date of Patent: Apr. 11, 2017

(54) VEHICULAR AIR CONDITIONER

(71) Applicant: KEIHIN CORPORATION, Tokyo (JP)

(72) Inventors: Shinya Chiba, Sakura (JP); Minoru Kitagawa, Sakura (JP)

(73) Assignee: KEIHIN CORPORATION, Tokyo (JP)

( * ) Notice: Subject to any disclaimer, the term of this patent is extended or adjusted under 35 U.S.C. 154(b) by 471 days.

(21) Appl. No.: 14/327,034

(22) Filed: Jul. 9, 2014

(65) Prior Publication Data

US 2015/0017903 A1    Jan. 15, 2015

(30) Foreign Application Priority Data

Jul. 11, 2013    (JP) .................................. 2013-145315

(51) Int. Cl.
*B60H 1/00*    (2006.01)

(52) U.S. Cl.
CPC ....... *B60H 1/0005* (2013.01); *B60H 1/00857* (2013.01); *B60H 2001/00092* (2013.01)

(58) Field of Classification Search
USPC .......................................................... 454/159
See application file for complete search history.

(56) References Cited

U.S. PATENT DOCUMENTS

| | | | | |
|---|---|---|---|---|
| 1,219,392 A | * | 3/1917 | Hagen | F16K 51/02 251/158 |
| 1,256,759 A | * | 2/1918 | Wilson | F16K 1/305 137/613 |
| 1,797,490 A | * | 3/1931 | Wilson | F16K 31/54 251/250.5 |
| 4,258,580 A | * | 3/1981 | Lowe | F16H 19/04 74/109 |
| 5,620,301 A | * | 4/1997 | Lawer | F01D 17/162 415/150 |
| 5,701,949 A | * | 12/1997 | Yamaguchi | B60H 1/00664 137/872 |
| 5,862,896 A | * | 1/1999 | Villbrandt | B60R 7/06 16/49 |
| 6,092,592 A | * | 7/2000 | Toyoshima | B60H 1/0005 165/204 |
| 6,209,404 B1 | * | 4/2001 | Le | B60H 1/00842 454/69 |

(Continued)

FOREIGN PATENT DOCUMENTS

JP    10-250345    9/1998

*Primary Examiner* — Gregory Huson
*Assistant Examiner* — Martha Becton
(74) *Attorney, Agent, or Firm* — Rankin, Hill & Clark LLP

(57) ABSTRACT

In an air conditioner casing of a vehicular air conditioner, an evaporator is arranged in a cold air passage, and a heater core is arranged in a warm air passage downstream from the cold air passage. A first air mixing damper is disposed in a warm air opening between the cold air passage and the warm air passage, and a second air mixing damper disposed in a cold air opening between the cold air passage and a bypass passage. Switching from a cooling mode to a heating mode, the first air mixing damper is opened at a constant speed proportional to the driving angle of a drive unit, and the second air mixing damper is initially rotated at a high speed by a predetermined angle immediately after the start of the closing operation, and thereafter is rotated at a low speed.

3 Claims, 4 Drawing Sheets

(56) References Cited

U.S. PATENT DOCUMENTS

| | | | |
|---|---|---|---|
| 7,108,599 B2* | 9/2006 | Kachi | B60H 1/00428 |
| | | | 165/202 |
| 8,025,096 B2* | 9/2011 | Kang | B60H 1/0065 |
| | | | 165/202 |
| 2002/0108460 A1* | 8/2002 | Nishishita | B60H 1/00857 |
| | | | 74/469 |
| 2009/0250193 A1* | 10/2009 | Ishikawa | B60H 1/00028 |
| | | | 165/61 |
| 2013/0065498 A1* | 3/2013 | Hara | B60H 1/00857 |
| | | | 454/69 |
| 2013/0095739 A1* | 4/2013 | Lee | B60H 1/00857 |
| | | | 454/143 |
| 2015/0226292 A1* | 8/2015 | Sokolofsky | F16H 19/04 |
| | | | 74/109 |

* cited by examiner

VEHICULAR AIR CONDITIONER

CROSS-REFERENCE TO RELATED APPLICATION

This application is based upon and claims the benefit of priority from Japanese Patent Application No. 2013-145315 filed on Jul. 11, 2013, the contents of which are incorporated herein by reference.

BACKGROUND OF THE INVENTION

Field of the Invention

The present invention relates to a vehicular air conditioner that is mounted in a vehicle for adjusting the temperature in the interior of a vehicle cabin by blowing air, the temperature of which is adjusted by a heat exchanger, into the vehicle cabin.

Description of the Related Art

Heretofore, a vehicular air conditioner, which is installed in a vehicle, takes in interior and exterior air by a fan into an air conditioner casing, which is formed with an airflow passage in the interior thereof. Chilled air, which is cooled by an evaporator type of cooling means, and heated air, which is heated by a heater core type of heating means, are mixed at a desired mixing ratio inside the air conditioner casing through operation of air mixing doors. Thereafter, for example, the mixed air passes through a blower duct from a plurality of openings disposed in the air conditioner casing, and is blown out into the interior of the vehicle cabin to thereby adjust the temperature and humidity in the vehicle cabin.

As a vehicular air conditioner of this type, for example as disclosed in Japanese Laid-Open Patent Publication No. 10-250345, on a downstream side from the evaporator, a first air mixing door is disposed in a passage that communicates with the heater core, and a second air mixing door is disposed in a passage that is connected directly to the blower opening in bypassing relation to the heater core. In addition, by controlling driving of the first and second air mixing doors, respectively, the temperature of the air that is blown out into the interior of the vehicle cabin from the blower opening is adjusted.

In the case that two air mixing doors are provided in this manner, in comparison with a case in which cooled air and heated air are adjusted at a given mixing ratio by a single air mixing door, the apparatus can be made smaller in scale. Additionally, by using a butterfly type instead of a sliding type of air mixing door, delivery and distribution of air from the upstream side to the downstream side can be enhanced, together with the advantage that air can be guided suitably to the blower opening.

SUMMARY OF THE INVENTION

However, with the aforementioned conventional vehicular air conditioner, for example, in the case that switching from a cooling mode to a heating mode is carried out, in a condition in which the second air mixing door is completely opened and under a state in which the first air mixing door is completely closed, the second air mixing door is opened simultaneously with operating a drive unit and closing the first air mixing door in proportion to a driving amount (drive angle) of the drive unit. Then, a proportional change does not occur in the temperature of the air that is blown out from the blower opening with respect to the driving amount, and with almost no temperature change occurring with respect to the driving amount, or an abrupt change in temperature takes place merely by a slight change in the driving amount. For this reason, there is a concern that comfort is sacrificed owing to the fact that the temperature cannot be finely controlled, even though the occupant attempts to control the temperature at which air is blown from the outlet port.

A general object of the present invention is to provide a vehicular air conditioner, which is capable of enhancing the comfort of a vehicle occupant, by enabling a temperature control to be carried out with high precision, by effecting a cooperative control between a cold air damper and a warm air damper that collectively make up an air mixing door.

The present invention is characterized by a vehicular air conditioner equipped with a blower fan, an air conditioner casing having a flow path through which air flows and a blower opening for blowing the air into interior of a vehicle cabin, a cooling unit disposed in interior of the air conditioner casing configured to cool the air, and a heating unit disposed in the interior of the air conditioner casing configured to heat the air, the flow path including a cold air passage in which the cooling unit is arranged, a warm air passage formed on a downstream side of the cold air passage and in which the heating unit is arranged, and a bypass passage provided on a downstream side of the cooling unit in bypassing relation to the heating unit, wherein air, which has passed through the warm air passage and the bypass passage, is blown into the interior of the vehicle cabin from the blower opening, the vehicular air conditioner comprising:

an air mixing damper disposed on a downstream side of the cooling unit for adjusting a proportion at which air is blown into a warm air opening that communicates from the cold air passage to the warm air passage, and into a cold air opening that communicates from the cold air passage to the bypass passage; and a drive mechanism configured to drive the air mixing damper, wherein:

the air mixing damper includes a first damper configured to open and close one of the warm air opening and the cold air opening, and a second damper configured to open and close another of the warm air opening and the cold air opening; and the drive mechanism includes a drive source that is rotated to drive the first and second dampers, the first damper being turned proportional to a rotational angle of the drive source over entirety of a rotary driven range of the drive source, and the second damper being turned such that a temperature of the air blown from the blower opening and the rotational angle of the drive source establish a linear relationship or a substantially linear relationship.

According to the present invention, in the interior of the air conditioner casing that makes up the vehicular air conditioner, the first damper is turned in proportion to rotation of the drive source over the entire rotary driven range of the drive source, whereas the second damper is turned such that the temperature of the air that is blown from the blower opening is proportional to the rotation of the drive source. Therefore, in the vehicular air conditioner, when switching takes place from a cooling mode to a heating mode, the first damper is opened in proportion to rotation of the drive source, whereas the rotational speed of the second damper is controlled such that the temperature of the air that is blown from the blower opening into the interior of the vehicle cabin changes linearly. Thus, since the change in temperature tracks suitably with respect to the rotation of the drive source, the temperature of the air that is blown into the vehicle cabin can be changed linearly, and comfort of the vehicle occupant can be enhanced.

The above and other objects, features and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENT

Figure 1:
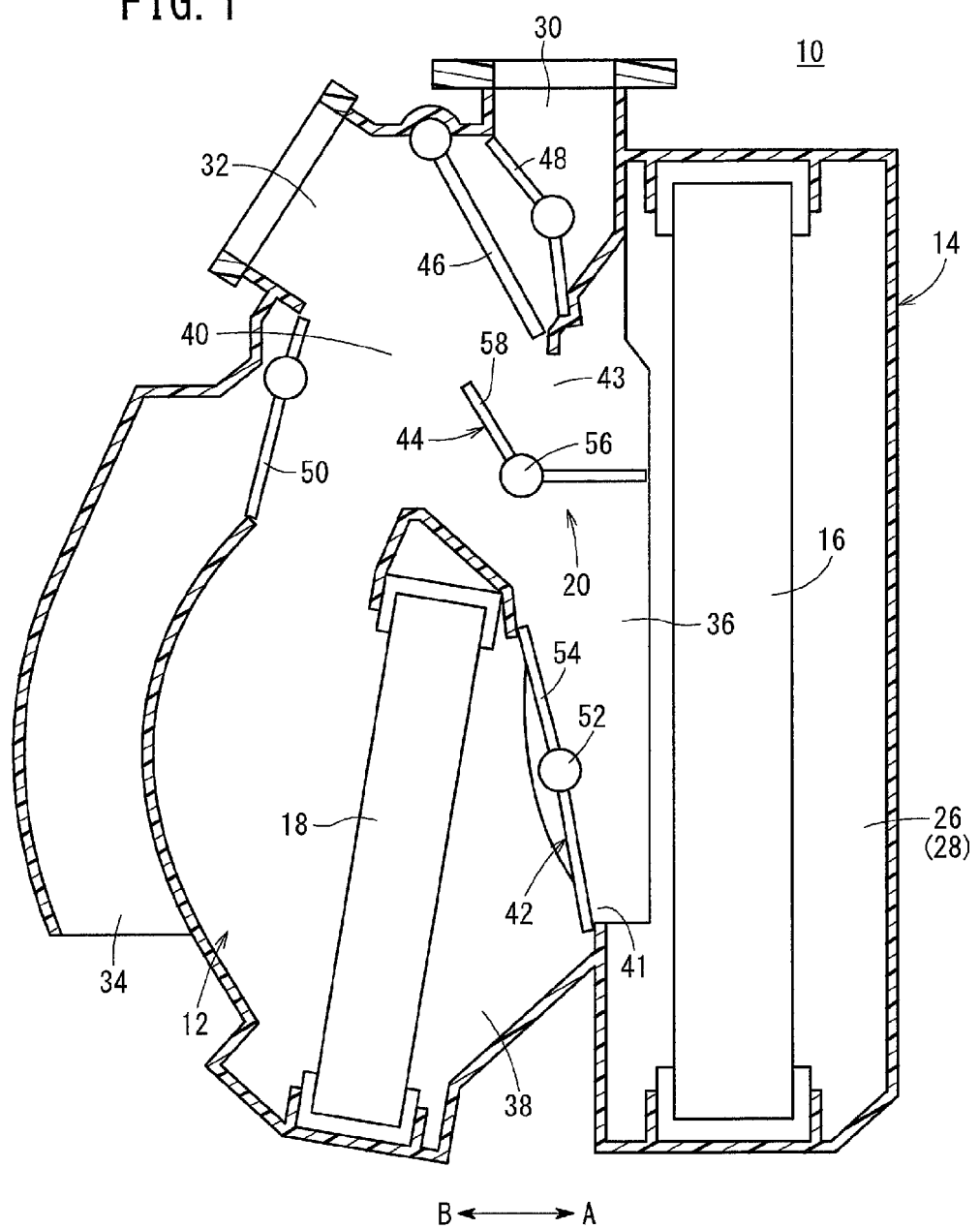
FIG. 1 is an overall configuration diagram of a vehicular air conditioner according to an embodiment of the present invention.

As shown in FIG. 1, a vehicular air conditioner 10 includes an air conditioner casing 14 constituted by respective airflow passages 12, an evaporator (cooling unit) 16 arranged in the interior of the air conditioner casing 14 for cooling the air, a heater core (heating unit) 18 for heating the air, a damper mechanism 20, which operates to switch the flow of air that flows through the respective passages 12, a drive unit 22 that drives the damper mechanism 20, and a driving force transmission mechanism 24 for transmitting to the damper mechanism 20 a driving force that is output by the drive unit 22. Hereinbelow, the right side (in the direction of the arrow A) of the vehicular air conditioner 10 shown in FIG. 1 will be referred to as a front side of the vehicle, and the left side (in the direction of the arrow B) will be referred to as a rear side of the vehicle.

The air conditioner casing 14 is constituted from substantially symmetrically shaped first and second divided cases 26, 28. The first and second divided cases 26, 28 are disposed in a separable fashion in a widthwise direction (the direction of the arrow C in FIG. 2) of the vehicle. Further, a vent blower opening 30 through which air is blown out in the vicinity of the face of a vehicle occupant, and a defroster blower opening 32 through which air is blown out in the vicinity of a front window of the vehicle, are disposed adjacently to one another upwardly of the air conditioner casing 14. A foot blower opening 34, through which air is blown in the vicinity of the feet of the vehicle occupant, opens downwardly on the rear side (in the direction of the arrow B) of the air conditioner casing 14.

On the other hand, in the interior of the air conditioner casing 14, the evaporator 16 is accommodated on the front side (in the direction of the arrow A), and the heater core 18 is accommodated on the rear side (in the direction of the arrow B) on a downstream side of the evaporator 16. In addition, air is introduced into the air conditioner casing 14 through a non-illustrated duct that is connected to a position on the upstream side of the evaporator 16. The introduced air is cooled by passing through the evaporator 16, whereas the air is heated by passing through the heater core 18.

The passages 12 in the air conditioner casing 14 include a cold air passage 36 in which the evaporator 16 is arranged, a warm air passage 38 formed on a downstream side of the cold air passage 36 and in which the heater core 18 is arranged, and a bypass passage 40 that bypasses the heater core 18 on a downstream side from the cold air passage 36. Substantially in the center of the air conditioner casing 14, the cold air passage 36 is connected to the warm air passage 38 through a warm air opening 41, and is connected to the bypass passage 40 through a cold air opening 43.

The damper mechanism 20 includes a first air mixing damper (first damper, warm air damper) 42, which is disposed between the evaporator 16 and the heater core 18 and opens and closes the warm air opening 41, a second air mixing damper (second damper, cold air damper) 44, which is disposed in the bypass passage 40 on a downstream side from the evaporator 16 and opens and closes the cold air opening 43, a vent switching damper 46 that switches the blowing state of the vent blower opening 30 and the defroster blower opening 32, a vent adjusting damper 48 for adjusting the amount of air that is blown into the vehicle cabin from the vent blower opening 30, and a foot adjusting damper 50 for adjusting the blowing state from the warm air passage 38 to the foot blower opening 34.

The first air mixing damper 42 is of a butterfly structure, for example, having two blades 54 extending in directions mutually away from each other about a rotary shaft 52. The rotary shaft 52 of the first air mixing damper 42 is disposed in a widthwise direction of the air conditioner casing 14, and both ends thereof are supported for rotation, respectively, on outer walls of the first divided case 26 and the second divided case 28.

In addition, concerning the first air mixing damper 42, for example, a sub-arm 92 (see FIG. 3) of a first driven link 68 of a later-described driving force transmission mechanism 24 is provided on an end of the rotary shaft 52 on the outer wall side of the second divided case 28, thereby enabling the first air mixing damper 42 to be rotated a predetermined angle by transmission of a driving force of the drive unit 22 through the first driven link 68.

More specifically, as shown in FIG. 1, from a completely closed condition in which the upper end and the lower end thereof abut against (contact) inner wall portions of the air conditioner casing 14, the first air mixing damper 42 is rotated so that the upper end approaches the side of the evaporator 16 (in the direction of the arrow A) and the lower end approaches the side of the heater core 18 (in the direction of the arrow B). Consequently, in the air conditioner casing 14, by opening and closing the warm air opening 41, the state of communication between the cold air passage 36 on the downstream side of the evaporator 16 and the warm air passage 38 on the upstream side of the heater core 18 is switched, whereby air flows at a predetermined flow rate from the cold air passage 36 to the warm air passage 38.

Similar to the first air mixing damper 42, the second air mixing damper 44 is of a butterfly structure, for example, which is substantially V-shaped in cross section, having two blades 58 extending in directions mutually away from each other about a rotary shaft 56. In the interior of the air conditioner casing 14, the second air mixing damper 44 is arranged above the first air mixing damper 42. The rotary shaft 56 of the second air mixing damper 44 is disposed in a widthwise direction of the air conditioner casing 14, and both ends thereof are supported for rotation, respectively, on outer walls of the first divided case 26 and the second divided case 28.

Figure 2:
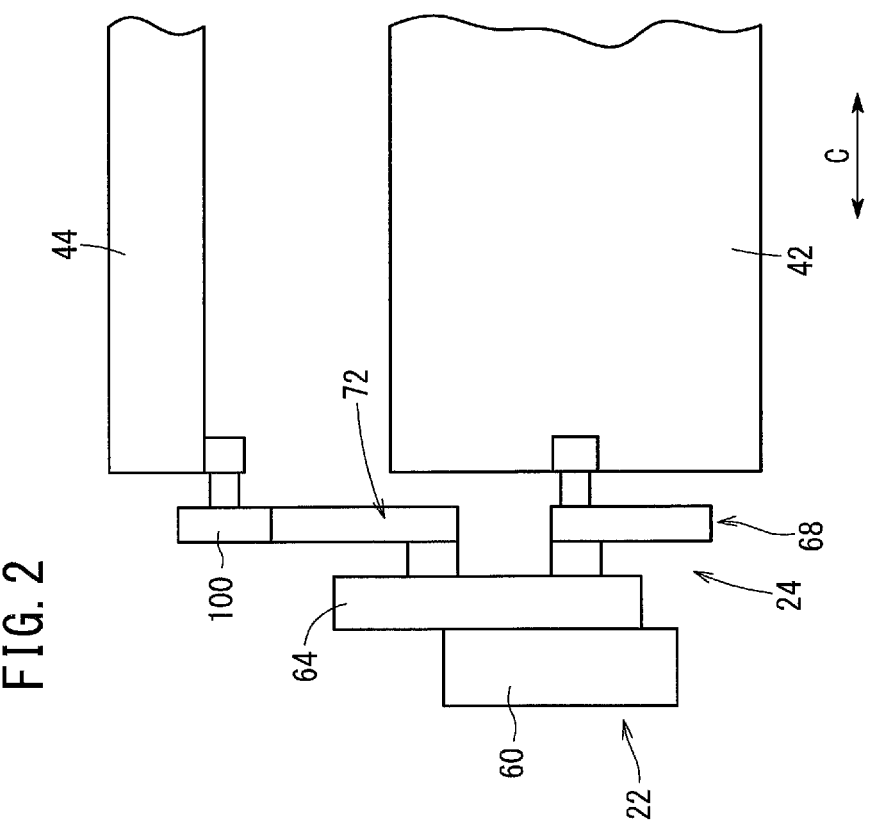
FIG. 2 is an enlarged plan view showing first and second air mixing dampers, a drive unit, and a driving force transmission mechanism in the vehicular air conditioner shown in FIG. 1.
Figure 3:
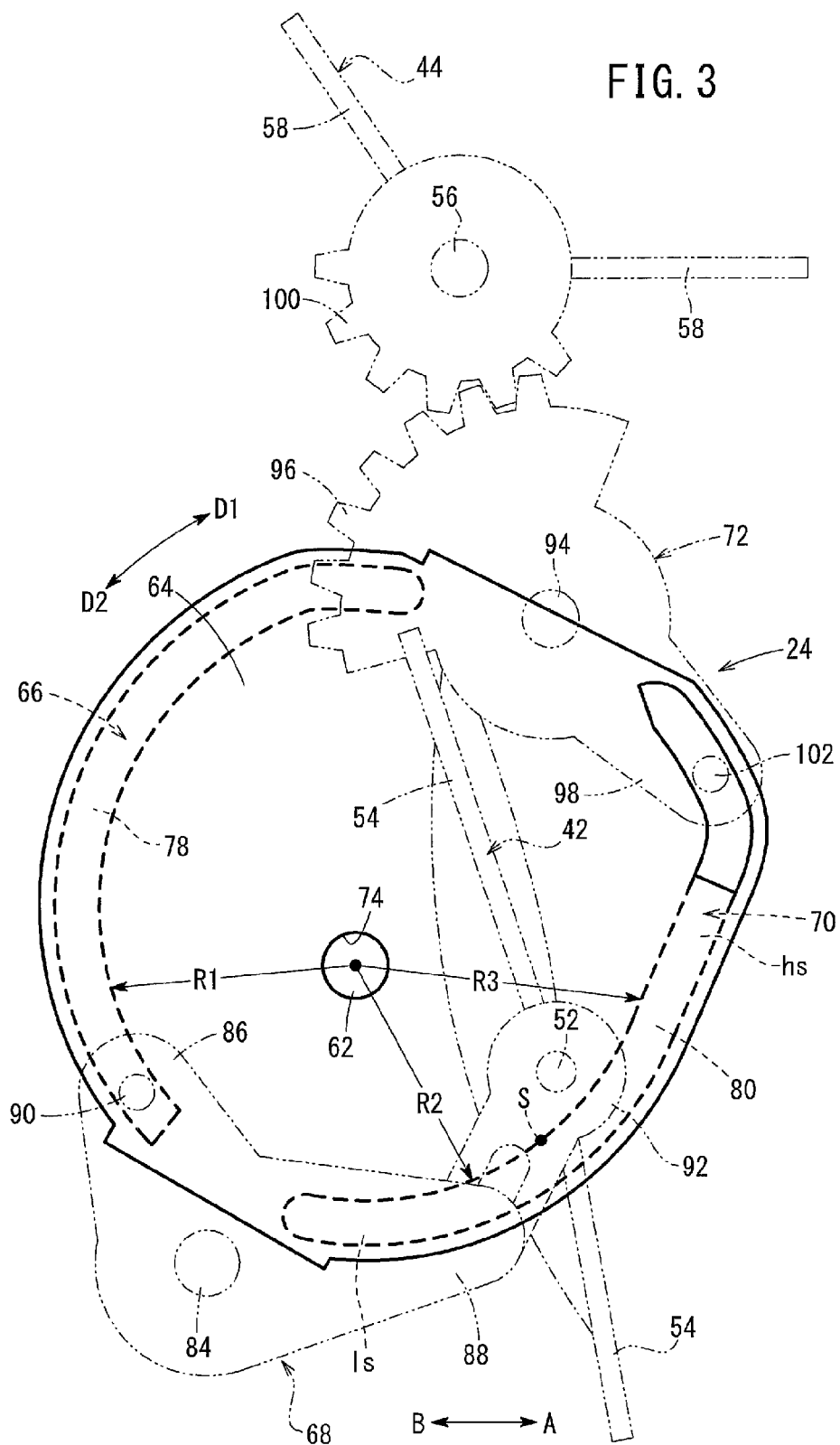
FIG. 3 is an enlarged side view showing the first and second air mixing dampers, and the driving force transmission mechanism including a link plate that is provided on a passenger side, in the vehicular air conditioner of FIG. 1.

In addition, as shown in FIGS. 2 and 3, concerning the second air mixing damper 44, a second driven link 72 of the later-described driving force transmission mechanism 24 is enmeshed through a gear member 100 on an end of the rotary shaft 56 on the outer wall side of the second divided case 28, thereby enabling the second air mixing damper 44 to be rotated a predetermined angle by transmission of a driving force of the drive unit 22 through the second driven link 72.

More specifically, from a completely closed condition in which the upper end and the lower end thereof abut against (contact) inner wall portions of the air conditioner casing 14, the second air mixing damper 44 is rotated so that the upper end approaches the front side (in the direction of the arrow A), and the lower end approaches the rear side (in the direction of the arrow B). Consequently, in the air conditioner casing 14, by opening and closing the cold air opening 43, the state of communication between the cold air passage 36 formed on the downstream side of the evaporator 16 and the bypass passage 40 that bypasses the heater core 18 is switched, whereby air flows at a predetermined flow rate from the cold air passage 36 to the bypass passage 40 (see FIG. 1).

Further, because the second air mixing damper 44 is formed with a V-shape in cross section, which opens upwardly in the open state, air that flows downstream from the evaporator 16 can advantageously be guided upwardly toward the direction in which the vent blower opening 30 opens.

The drive unit 22, for example, is made up from an actuator (drive source) 60, which is rotated based on control signals from a controller, wherein by input of such control signals, a drive shaft 62 is rotated in a predetermined direction and by a predetermined angle of rotation. The actuator 60 is disposed on the outer wall of the second divided case 28, and controls driving of the first and second air mixing dampers 42, 44.

As shown in FIG. 3, the driving force transmission mechanism 24 includes a substantially disk-shaped (or having another shape) link plate 64, which is disposed on the outer wall of the second divided case 28 corresponding to the actuator 60 of the drive unit 22 (see FIG. 2) and is supported rotatably on the outer wall, the first driven link 68, which is engaged with a first link groove 66 of the link plate 64 and drives the first air mixing damper 42, and the second driven link 72, which is engaged with a second link groove 70 of the link plate 64 and drives the second air mixing damper 44.

More specifically, the driving force transmission mechanism 24 transmits a driving force, which is output from the actuator 60, to the first air mixing damper 42 and the second air mixing damper 44.

The drive shaft 62 of the actuator 60 is inserted into a hole 74 that opens substantially in the center of the link plate 64, such that under a driving action of the actuator 60, the link plate 64 is rotated integrally therewith. The first and second link grooves 66, 70 are formed respectively in the vicinity of the outer edge of the link plate 64.

The first link groove 66 has a first groove portion 78, which extends from one end to the other end thereof. The first groove portion 78 is formed such that a radius (distance) R1 thereof about the hole 74 becomes progressively greater from the one end toward the other end.

Stated otherwise, the first groove portion 78 is formed such that the radius R1 thereof is variable about the hole 74. Further, the radius R1 of the first groove portion 78 is formed so as to become greater at a substantially constant rate of change from the one end to the other end.

Additionally, the first groove portion 78 is formed with a substantially constant width dimension, and the first link groove 66, which is made up from the first groove portion 78, extends substantially halfway around the link plate 64 in the vicinity of the outer edge thereof on the rear side (in the direction of the arrow B) of the vehicle.

One end of the second link groove 70 is formed to approach the one end of the first groove portion 78 on the first link groove 66, and the second link groove 70 has a second groove portion 80, which extends from the one end toward the other end side thereof, and is formed such that respective radii (distances) R2, R3 thereof about the hole 74 become greater commensurate with the separation thereof from the one end.

The second groove portion 80 has a low speed region ls, which is formed by the radius R2 from the one end up to a branch point S midway along the second groove portion 80, and a high speed region hs, which is formed by the radius R3 from the aforementioned branch point S to the other end of the second groove portion 80. The low speed region ls and the high speed region hs are formed such that the radii R2, R3 become progressively greater, respectively, from the one end to the other end side.

Further, the rate of change (hereinafter, referred to as a first rate of change) of the radius R2 of the low speed region ls differs from the rate of change (hereinafter, referred to as a second rate of change) of the radius R3 of the high speed region hs, and in particular, the second rate of change is greater than the first rate of change.

More specifically, the second groove portion 80 is formed so that the change in the radius of the high speed region hs, which extends from the branch point S to the other end, is greater than the change in the radius of the low speed region ls, which extends from the one end to the branch point S. The branch point S is disposed at an arbitrary point along the direction of extension of the second groove portion 80.

Additionally, the second groove portion 80 that makes up the second link groove 70 is formed with a substantially constant width dimension, and extends substantially halfway around the link plate 64 in the vicinity of the outer edge thereof on the front side (in the direction of the arrow A) of the vehicle, substantially symmetric with the first link groove 66 about the hole 74.

The first driven link 68 is disposed rotatably through a shaft 84 on outer walls of the first and second divided cases 26, 28. As shown in FIG. 3, the first driven link 68 includes a first arm 86, which extends in a radial outward direction with respect to the shaft 84, and a second arm 88, which extends with respect to the shaft 84 in a different direction than the first arm 86.

A first link pin 90, which is formed on an end of the first arm 86, is inserted into the first link groove 66 of the link plate 64, and the sub-arm 92, which is connected to the rotary shaft 52 of the first air mixing damper 42, is engaged with an end of the second arm 88.

By rotation of the link plate 64 under a driving action of the actuator 60, the first link pin 90 is moved along the first link groove 66, accompanied by the first driven link 68 being rotated in a predetermined direction and by a predetermined angle, whereby the first air mixing damper 42 is subjected to rotational movement via the sub-arm 92.

As shown in FIG. 3, the second driven link 72 is arranged above the first driven link 68, and is disposed rotatably through a shaft 94 on the outer walls of the first and second divided cases 26, 28. The second driven link 72 includes an arcuate gear 96, which is expanded in diameter in a radial outward direction with respect to the shaft 94, a third arm 98 formed on a side opposite from the gear 96 about the shaft 94, and the gear member 100 installed on an end of the rotary shaft 56 of the second air mixing damper 44.

Additionally, the gear 96 is engaged with the gear member 100, and a second link pin 102, which is formed on the end of the third arm 98, is inserted into the second link groove 70 of the link plate 64.

Moreover, by rotation of the link plate 64 under a driving action of the actuator 60, the second link pin 102 is moved along the second link groove 70, accompanied by the second driven link 72 being rotated in a predetermined direction and by a predetermined angle, whereby the second air mixing damper 44 is subjected to rotational movement via the gear member 100 that is engaged with the gear 96.

A case has been described above in which the first driven link 68 is constituted from two members including the sub-arm 92, and the second driven link 72 is constituted from two members including the gear member 100. However, the present invention is not limited to such a structure. The first and second driven links 68, 72 may both be constituted from a single member, each of which is capable of transmitting a driving force to the first air mixing damper 42 and the second air mixing damper 44, respectively, through the link plate 64.

The vehicular air conditioner 10 according to the present embodiment is constructed basically as described above. Next, an explanation shall be given concerning operations and advantages of the vehicular air conditioner 10. In the following description, as shown in FIG. 1, a state in which a cooling mode is selected, i.e., in which the first air mixing damper 42 is completely closed such that communication between the cold air passage 36 and the warm air passage 38 is blocked, and further, in which the second air mixing damper 44 is completely opened to establish communication between the cold air passage 36 and the bypass passage 40, will be regarded as an initial condition.

In the initial condition, the first link pin 90 of the first driven link 68 is positioned at the one end of the first groove portion 78 in the first link groove 66, and the second link pin 102 of the second driven link 72 is positioned at the other end of the second groove portion 80 in the second link groove 70. Therefore, the cold air passage 36 and the bypass passage 40 shown in FIG. 1 are placed in communication through the cold air opening 43, and air, which is supplied to the air conditioner casing 14 from a non-illustrated blower fan and is cooled by the evaporator 16, flows from the cold air passage 36, through the bypass passage 40, and to the vent blower opening 30, and the cooled air is blown in the vicinity of the face of a passenger in the vehicle cabin.

In a vent mode, the defroster blower opening 32 is closed by the vent switching damper 46 and the foot blower opening 34 also is closed by the foot adjusting damper 50. However, blowing of air is not limited to the vent blower opening 30, and air may also be blown to the defroster blower opening 32.

Next, in the case that switching is carried out from the aforementioned cooling mode to the heating mode, the first air mixing damper 42 is turned from the cooling mode condition described above, to thereby place the cold air passage 36 and the warm air passage 38 in communication, and together therewith, the second air mixing damper 44 is turned to a closed state, thereby blocking communication between the cold air passage 36 and the bypass passage 40.

First, by rotating the link plate 64 counterclockwise (in the direction of the arrow D2) under a driving action of the drive unit 22, the first link pin 90 is moved from the one end toward the other end of the first groove portion 78, and thereby moves progressively in a radial outward direction. Along with such movement, the first driven link 68 is turned counterclockwise about the shaft 84, and by rotation of the sub-arm 92, the first air mixing damper 42 is turned clockwise about the rotary shaft 52. At this time, concerning the rotational speed of the first air mixing damper 42, as shown by the characteristic line L1 in FIG. 4A, since the rate of change of the radius R1 of the first groove portion 78 in which the first link pin 90 is inserted is constant, the first air mixing damper 42 is opened progressively at a constant speed from the completely closed state.

Stated otherwise, the first air mixing damper 42 is rotated at an angle of rotation that is proportional to the angle of rotation of the actuator 60.

Figure 4A:
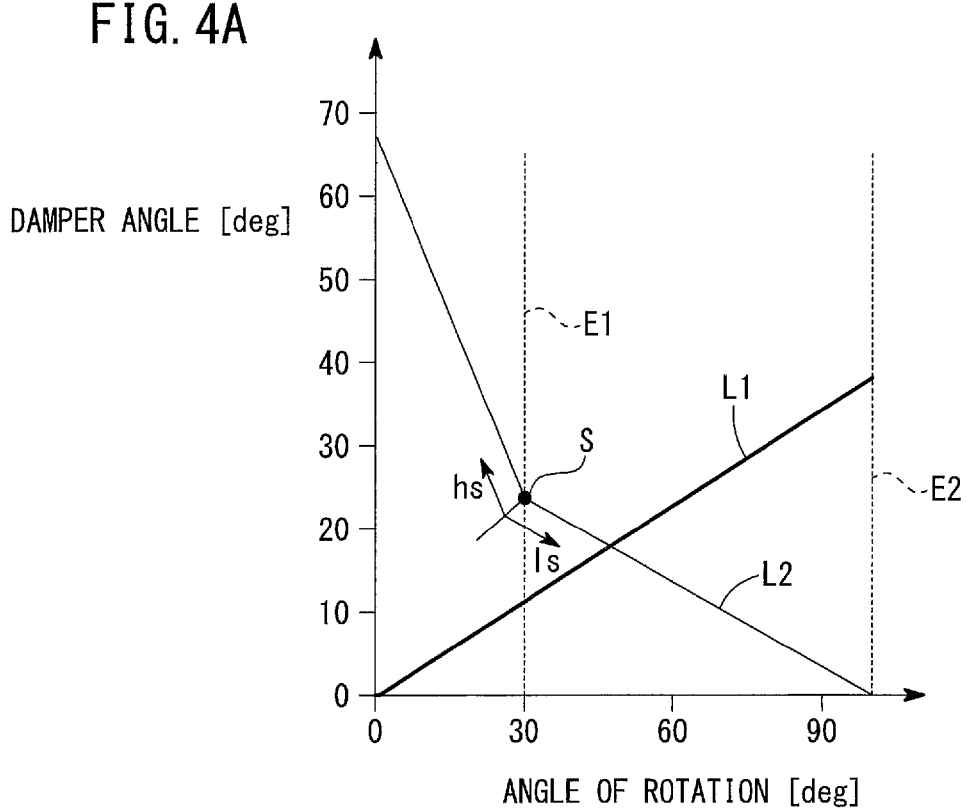
FIG. 4A is a characteristic diagram showing a relationship between angles of rotation of the first and second air mixing dampers and the angle of rotation of the drive unit, in the vehicular air conditioner of FIG. 1.

On the other hand, concerning the second air mixing damper 44, by rotating the link plate 64 counterclockwise (in the direction of the arrow D2), the second link pin 102 is moved from the other end toward the one end of the second groove portion 80. At this time, in the second groove portion 80, the rate of change of the radius R3 of the high speed region hs in which the second link pin 102 is inserted is set to be greater than the rate of change of the radius R2 of the low speed region ls. Therefore, the second link pin 102 is moved rapidly in a radial inward direction, accompanied by the second air mixing damper 44 starting to close from the open state thereof (refer to the characteristic line L2, and the range of the high speed region hs, as shown in FIG. 4A).

In addition, by rotation of the link plate 64, the second link pin 102 surpasses the branch point S of the second link groove 70, and moves into the low speed region ls formed with the radius R2. Thus, the rotational speed of the second driven link 72 is lowered, accompanied by a reduction in the speed of rotation of the second air mixing damper 44 (refer to the characteristic line L2, and the range of the low speed region ls, as shown in FIG. 4A).

More specifically, since the second groove portion 80 constituting the second link groove 70 includes the high speed region hs and the low speed region ls, wherein the rate of change in the radii thereof differ at the boundary defined by the branch point S, the rotational speed of the second air mixing damper 44 can be made to change at a midway point via the second driven link 72. Stated otherwise, when the second air mixing damper 44 is closed from the completely open condition, switching of the rotational speed can take place such that the second air mixing damper 44 is rotated at a high speed within a predetermined range (predetermined angle) from start of the closing operation up to the midway point, and then, after having been closed at the predetermined angle, is rotated at a low speed until reaching the completely closed condition.

In the foregoing manner, when the heating mode is implemented, the second air mixing damper 44, which carries out switching of the state of communication between the cold air passage 36 and the bypass passage 40, is rotated at a high speed up to the midway point, and the flow of air that has passed through the evaporator 16 to the side of the bypass passage 40 is suppressed. Consequently, after having switched to the heating mode, blowing of cold air into the vehicle cabin is suppressed, and immediately after switching to the heating mode, a reduction in the room temperature of the vehicle is avoided.

In this manner, by then turning the first air mixing damper 42 from the completely closed condition, the cold air passage 36 and the warm air passage 38 are placed in communication via the warm air opening 41, and air, which is supplied to the air conditioner casing 14 from the non-illustrated fan and is cooled by the evaporator 16, is heated to a predetermined temperature by passing from the cold air passage 36 and through the heater core 18. In addition, for example, air is blown from the foot blower opening 34 at a predetermined temperature and airflow rate in the vicinity of the feet of the occupant in the vehicle cabin. Simultaneously, the second air mixing damper 44 is rotated through the second driven link 72 that is engaged with the second link groove 70, and communication between the cold air passage 36 and the bypass passage 40 is blocked, whereby air that is cooled by the evaporator 16 is prevented from being blown out from the respective blower openings.

The relationship between the angle of rotation (degree of opening) when the first air mixing damper 42 is opened and closed, and the degree of opening when the second air mixing damper 44 is opened and closed will be described with reference to FIG. 4A. In FIG. 4A, the characteristic indicated by the degree of opening of the first air mixing damper 42 is shown by L1 (the bold solid line), whereas the characteristic indicated by the degree of opening of the second air mixing damper 44 is shown by L2 (the fine solid line). The vertical axis represents the degrees of opening of the first air mixing damper 42 and the second air mixing damper 44, whereas the horizontal axis represents the angle of rotation of the drive unit 22 including the actuator 60.

At first, in the case that switching is carried out from the cooling mode, in which the second air mixing damper 44 is in a completely open condition, and air, which has passed fully through the cold air passage 36 and the bypass passage 40 and is cooled by the evaporator 16, is blown through the bypass passage 40 and into the vehicle cabin from the vent blower opening 30, to the heating mode, based on a control signal supplied to the drive unit 22, the actuator 60 is rotated in an opposite direction to that used during the cooling mode (counterclockwise), to thereby rotate the link plate 64.

Consequently, via the first driven link 68, which is engaged with the first link groove 66 formed with the radius R1 having a constant rate of change, the first air mixing damper 42 is rotated in a clockwise direction and is opened at a constant speed progressively from the completely closed condition. On the other hand, via the second driven link 72, which is engaged with the high speed region hs of the second groove portion 80 formed with the radius R3 having a large rate of change, the second air mixing damper 44 is rotated counterclockwise from the completely open condition at a higher speed than the first air mixing damper 42, and the second air mixing damper 44 starts to close.

In addition, by further driving of the drive unit 22, the first air mixing damper 42 opens continually at a constant speed in proportion to the angle of rotation of the drive unit 22. On the other hand, concerning the second air mixing damper 44, the second link pin 102, which is engaged with the second link groove 70, surpasses the branch point S at the time that the drive unit 22 is rotated to the rotational angle E1, and thereafter, is moved along the low speed region ls of the second groove portion 80, which is formed with the radius R2 having a small rate of change. Consequently, the rotational speed of the second air mixing damper 44 becomes slower, whereupon the second air mixing damper 44 continues to be rotated slowly in a counterclockwise direction.

Finally, at a point in time at which the drive unit 22 is driven and has reached the rotational angle E2, the first air mixing damper 42 is placed in a completely open state, and the second air mixing damper 44 is placed in a completely closed state. Accordingly, the heating mode is implemented, in which the cold air passage 36 and the warm air passage 38 are in full communication with each other, and air that has been cooled by the evaporator 16 passes through the heater core 18 and is blown into the vehicle cabin from the foot blower opening 34, while communication between the cold air passage 36 and the bypass passage 40 is blocked.

More specifically, when switching takes place from the cooling mode to the heating mode, the first air mixing damper 42, which enables flow of air from the cold air passage 36 to the warm air passage 38, is turned to open at a constant speed, while simultaneously, the second air mixing damper 44 is rotated at a high speed within a fixed range (the high speed region hs) from the start of opening thereof, and closing is implemented rapidly. Consequently, blowing of chilled air through the bypass passage 40 and into the vehicle cabin can be suppressed.

Figure 4B:
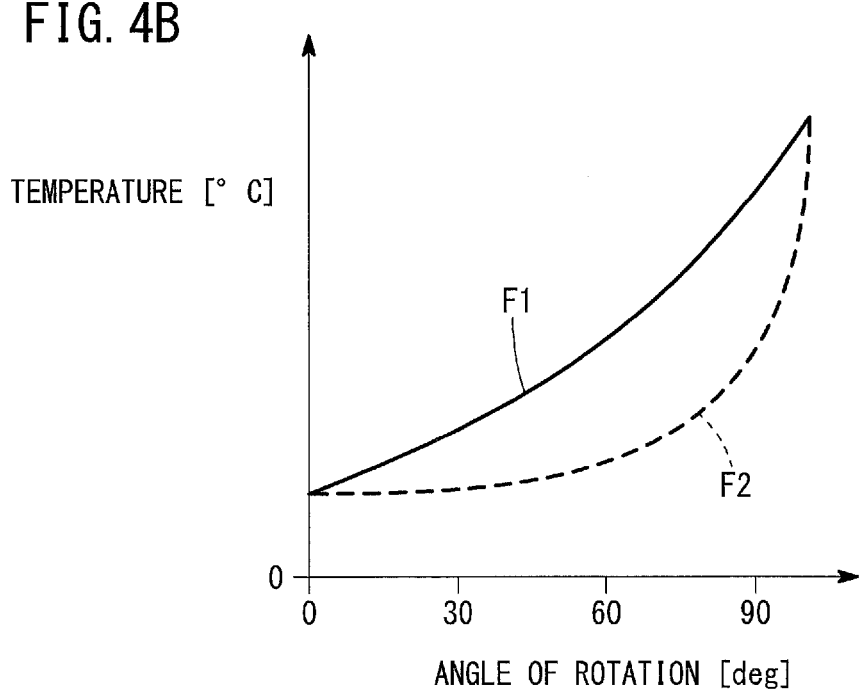
FIG. 4B is a characteristic diagram showing a relationship between angles of rotation of the first and second air mixing dampers and a change in temperature that occurs during a heating mode of the vehicular air conditioner of FIG. 1.

For this reason, as shown in FIG. 4B, compared with the temperature change in the conventional vehicular air conditioner (refer to the characteristic curve F2 in FIG. 4B), the temperature of the air that is blown into the vehicle cabin from the foot blower opening 34, etc., can be raised more closely in proportion to the rotational angle of the drive unit 22 (refer to the characteristic curve F1 in FIG. 4B). Stated otherwise, in the present invention, a relatively linear temperature control in proportion to the rotational angle of the drive unit 22 can be performed as shown in the characteristic curve F1, compared with the quadratic temperature change by the conventional vehicular air conditioner as shown in the characteristic curve F2.

As a result, when the vehicle occupant performs a switching operation to the heating mode by turning an operating lever, a change in the outlet port temperature can be brought about proportional to the amount (driving amount) at which the operating lever is operated. Thus, comfort of the vehicle occupant can be enhanced.

As described above, in the present embodiment, in a vehicular air conditioner 10 having in the interior of the air conditioner casing 14 the first air mixing damper 42 for performing flow rate control from the cold air passage 36 to the warm air passage 38, and the second air mixing damper 44 for performing flow rate control from the cold air passage 36 to the bypass passage 40, when switching from the cooling mode to the heating mode is carried out, the first air mixing damper 42 is opened proportional to the driving angle of the drive unit 22, whereas the rotational speed of the second air mixing damper 44 is controlled so that the temperature of the air, which is blown into the vehicle cabin for example from the foot blower opening 34, changes linearly.

As a result, using a single drive unit 22, by changing the speed of rotation of the second air mixing damper 44 through the driving force transmission mechanism 24, the temperature of the air that is blown into the vehicle cabin can be made to rise over time in a relatively linear fashion. Therefore, when the vehicle occupant performs a switching operation to the heating mode by turning an operating lever, a change in the outlet port temperature can be brought about proportional to the amount (driving amount) at which the operating lever is operated. Thus, comfort in the vehicle cabin can be enhanced.

Further, since the rotational speed of the first and second air mixing dampers 42, 44 can be controlled, respectively, by the groove shapes of the first and second link grooves 66, 70 that are formed in the link plate 64, there is no need to provide separate actuators 60 for each of the first and second air mixing dampers 42, 44. Therefore, a cooperative control between the first air mixing damper 42 and the second air mixing damper 44 can be performed with a simple structure, and the number of parts constituting the vehicular air conditioner can be reduced accompanied by a reduction in production costs.

Furthermore, since the heater core 18 is arranged in the warm air passage 38, when air flows downstream from the evaporator 16, airflow resistance increases compared to the case of flowing through the bypass passage 40, and in the case that the angle of rotation (degree of opening) of the first and second air mixing dampers 42, 44 is the same, it is easier for air to flow through the bypass passage 40 that has a small airflow resistance. For this reason, by closing the second air mixing damper 44 at a high speed responsive to the difference in airflow resistance, after having switched to the heating mode, flowing of cold air through the bypass passage 40 and into the vehicle cabin can be suppressed, and by the warm air that has passed through the heater core 18, the vehicle cabin can be heated over time in a relatively linear fashion.

The vehicular air conditioner according to the present invention is not limited to the aforementioned embodiment, and it is a matter of course that various additional or modified structures may be adopted therein without deviating from the essential gist of the present invention.

What is claimed is:

1. A vehicular air conditioner equipped with a blower fan, an air conditioner casing having a flow path through which air flows and a blower opening for blowing the air into interior of a vehicle cabin, a cooling unit disposed in interior of the air conditioner casing configured to cool the air, and a heating unit disposed in the interior of the air conditioner casing configured to heat the air, the flow path including a cold air passage in which the cooling unit is arranged, a warm air passage formed on a downstream side of the cold air passage and in which the heating unit is arranged, and a bypass passage provided on a downstream side of the cooling unit in bypassing relation to the heating unit, wherein air, which has passed through the warm air passage and the bypass passage, is blown into the interior of the vehicle cabin from the blower opening, the vehicular air conditioner comprising:
   an air mixing damper disposed on a downstream side of the cooling unit for adjusting a proportion at which air is blown into a warm air opening that communicates from the cold air passage to the warm air passage, and into a cold air opening that communicates from the cold air passage to the bypass passage; and
   a drive mechanism configured to drive the air mixing damper, wherein:
   the air mixing damper includes a first damper configured to open and close one of the warm air opening and the cold air opening, and a second damper configured to open and close another of the warm air opening and the cold air opening; and
   the drive mechanism includes a drive source that is rotated to drive the first and second dampers, the first damper being turned proportional to a rotational angle of the drive source over entirety of a rotary driven range of the drive source, and the second damper being turned such that a temperature of the air blown from the blower opening and the rotational angle of the drive source establish a linear relationship or a substantially linear relationship.

2. The vehicular air conditioner according to claim 1, wherein the drive mechanism comprises:
   the drive source;
   a link plate connected to the drive source and including first and second link grooves;
   a first driven link, which is engaged with the first link groove and transmits rotation of the link plate to the first damper; and
   a second driven link, which is engaged with the second link groove and transmits rotation of the link plate to the second damper,
   wherein the link plate comprises a rotary shaft to which the drive source is connected, the first link groove being formed such that a radius thereof about the rotary shaft changes at a constant rate of change over an entire range by which the first damper is turned, and the second link groove being formed such that a radius thereof about the rotary shaft undergoes a change at a midway point within the entire range by which the first damper is turned.

3. The vehicular air conditioner according to claim 1, wherein:
   the first damper is a warm air damper that closes the warm air opening, and the second damper is a cold air damper that closes the cold air opening; and
   when closing the bypass passage with the cold air damper, the cold air damper is rotated at a high speed until reaching a predetermined angle, and is rotated at a low speed after having reached the predetermined angle.

* * * * *